Figure 1:
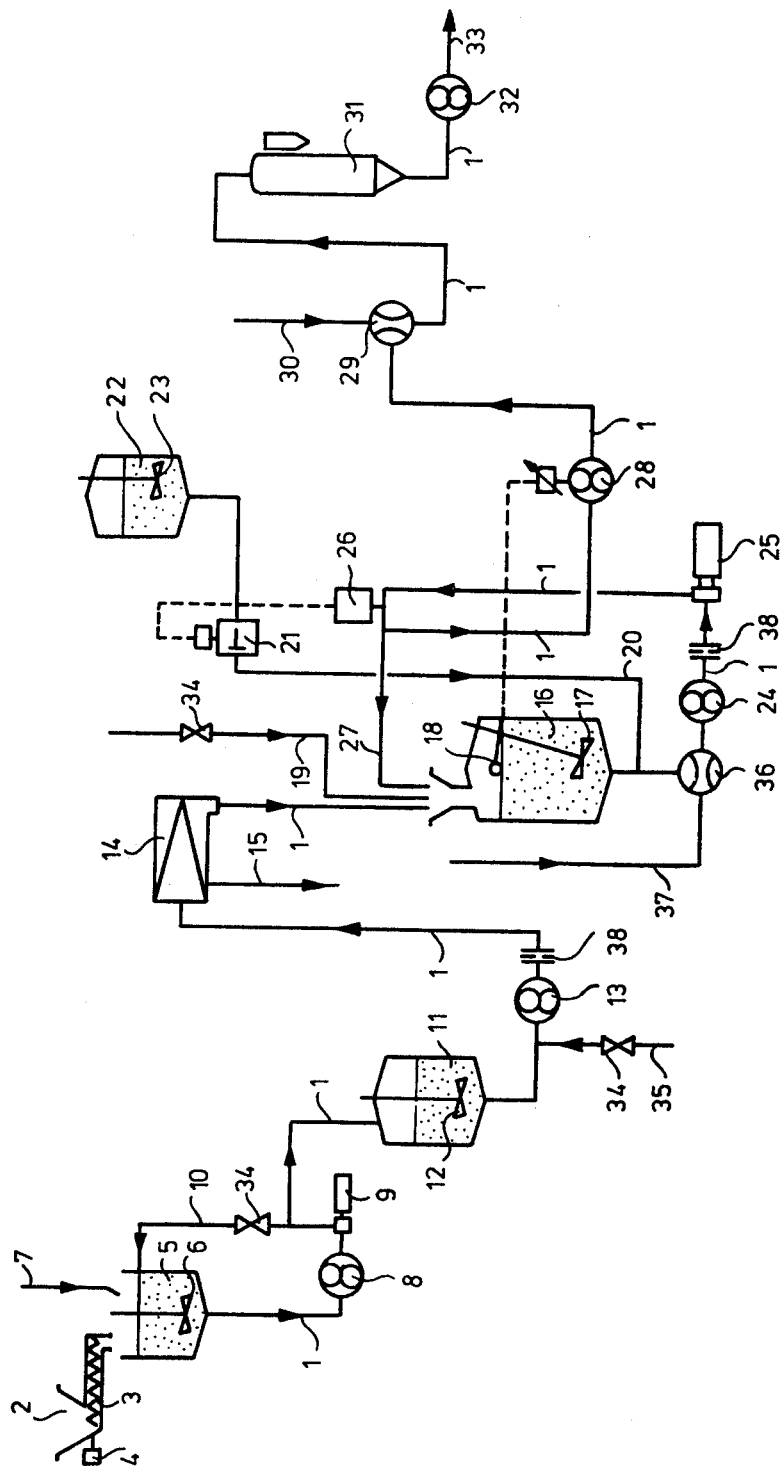

United States Patent [19]

Badertscher et al.

[11] 4,096,586
[45] Jun. 20, 1978

[54] SOLUBILIZATION OF CASEIN

[75] Inventors: Ernest Badertscher, Orbe; Michel Chaveron, Vevey; Valentin Wenner, La Tour-de-Peilz, all of Switzerland

[73] Assignee: Societe D'Assistance Technique Pour Produits Nestle S.A., La Tour-de-Peilz, Switzerland

[21] Appl. No.: 694,234

[22] Filed: Jun. 9, 1976

Related U.S. Application Data

[62] Division of Ser. No. 663,715, Mar. 4, 1976, Pat. No. 4,055,555.

[51] Int. Cl.² .............................................. A23J 3/00
[52] U.S. Cl. .................................... 366/136; 99/452; 23/287; 366/290
[58] Field of Search ................. 99/452, 460; 426/580, 426/583, 590, 804; 23/287, 267 MS, 272.6 R, 271 P; 259/5–8, 19, 37, 61, 64

[56] References Cited
U.S. PATENT DOCUMENTS

| 2,714,068 | 7/1955 | Bernhart | 426/580 |
| 2,998,315 | 8/1961 | Peebles | 426/583 |
| 3,608,869 | 9/1971 | Woodle | 259/7 |

Primary Examiner—Harvey C. Hornsby
Assistant Examiner—Robert Pous
Attorney, Agent, or Firm—Watson, Leavenworth, Kelton & Taggart

[57] ABSTRACT

An apparatus for carrying out the process for solubilizing a suspension of casein in powder form in an aqueous medium, the casein suspension containing at most 270 g of casein per liter of aqueous medium, which comprises leaving the casein suspension to age for at least 10 minutes, after which a solubilizing agent is progressively added to this suspension until a homogeneous solution is obtained.

Application to acid casein, the solubilizing agent being an alkaline agent. Application to phosphocalcic and rennet caseins, the solubilizing agent being a calcium-complexing agent.

4 Claims, 2 Drawing Figures

SOLUBILIZATION OF CASEIN

This is a division of application Ser. No. 663,715, filed Mar. 4, 1976 now U.S. Pat. No. 4055555.

This invention relates to a process for solubilizing a suspension of casein in powder form in an aqueous medium, and to an apparatus for carrying out this process.

Casein which, as the principal protein in milk, is the noble material thereof, can be isolated fairly easily by insolubilization. Insolubilization is, schematically, carried out by three different methods: by acidifying milk to the isoelectric point of casein, i.e., to a pH of about 4.5, in which case the casein obtained is known as acid casein; by the addition of calcium salts to milk, in which case the casein obtained is known as phosphocalcic casein; and finally by the addition under certain conditions to milk of an enzyme known as rennet, in which case the casein obtained is known as rennet casein.

In order to be able to reconstitute milk or milk-based products as and when required, i.e., irrespective of geographical constraints or seasonal variations, there is a potential interest in bringing these caseins into a form in which they can be easily stored and transported, i.e., into powder form, and solubilized in water without any major difficulties. Unfortunately, the redissolution in water of acid casein in powder form, although theoretically necessitating the mere addition of a base, has in practice to be carried out with so many precautions (to avoid the formation of totally insoluble clumps) that the use of acid casein in powder form has not benefited from the development which might have been expected. The dissolution of phosphocalcic casein in powder form by means of solubilization salts involves similar problems. So far as rennet casein in powder form is concerned, it is known to be insoluble.

An object of the present invention is to provide a solution to these problems. The present invention provides a process for solubilizing a suspension of casein in powder form in an aqueous medium, the casein suspension containing at most 270 g of casein per liter of aqueous medium, which comprises leaving the casein suspension to age for at least 10 minutes, after which a solubilizing agent is progressively added to the suspension until a homogeneous solution is obtained.

In the context of the invention, the expression "the casein suspension is left to age" means that addition of the solubilizing agent to the suspension is not made until the casein in powder form is hydrated throughout. Unless this period of aging is observed, insoluble clumps are formed during addition of the solubilizing agent because the casein particles, whilst remaining dry inside, become covered with and impermeable layer of the reaction product of the casein with the solubilizing agent. In other words, it is not possible to obtain a homogeneous solution. It has been found that the ageing time has to be at least 110 minutes and preferably 30 minutes, during which the suspension is advantageously stirred. The suspension should not contain any more than 270 g of casein per liter of aqueous medium, otherwise the corresponding solution obtained is not homogeneous and still contains particles of the starting casein. In fact this upper limit is theoretical because, in practice, values of the order of 250 g/l should really not be exceeded because otherwise the solutions obtained become excessively viscous and difficult to handle. It is preferred to use casein suspensions containing from 180 to 240 g/l of water or aqueous medium which give normally fluid solutions.

In the context of the invention, a "solubilizing agent" is an agent capable of making the individual particles of the starting casein disappear to leave a homogeneous solution. To make the description of the invention easier to understand, we shall now describe three cases where the casein used in accordance with the invention is respectively an acid casein, a phosphocalcic casein and a rennet casein.

In cases where the casein suspended is an acid casein, the solubilizing agent is an alkaline agent, for example a base or a basic alkali metal or alkaline earth metal salt, and a true solution is obtained, i.e., an aqueous solution of caseinate or casein salt. It is possible in this way to prepare sodium, potassium or calcium caseinates by adding to the starting suspension sodium, potassim or calcium hydroxide or even carbonates or bicarbonates of sodium, potassium or calcium. Solubilization is obtained at a pH of about 6.5 to 7.0. The expression "acid casein" is used in its broad sense and covers both traditional acid casein directly obtained by acidifying milk, and acid caseins obtained indirectly, such as for example a reacidified rennet casein, i.e., freed from most of its calcium by liberal washing with acid.

In cases where the suspended casein is a phosphocalcic casein, the solubilizing agent is a complexing agent for the calcium, for example a citrate or a phosphate. The solution obtained is a true solution. It is possible in this way to prepare mixed calcium-sodium or calcium-potassium caseinates by adding to the starting suspension sodium or potassim citrate or phosphate. It is pointed out that addition of the calcium-complexing agent is accompanied by a modification in the pH of the medium which is originally of the order of pH 6. It has been found that solubilization is obtained when the pH reaches for example pH 6.8 where the complexing agent used is a citrate, and pH 7.5 where the complexing agent used is a phosphate. These pH-values correspond to an addition of complexing agent of approximately 0.3 millimole/g of phosphocalcic casein for the citrate, and of 0.7 millimole/g of phosphocalcic casein for the phosphate. It is preferred to add from 0.4 to 1 millimole/g so as to obtain a pH-value of from 6.9 to 8.0 and from 7.5 to 8.0, respectively. Finally, where the suspended casein is a rennet casein, the solubilizing agent is also a complexing agent for the calcium, such as a citrate or a phosphate, although the caseinate solution obtained in this case is a colloidal solution, in some cases even a gel. For a suspension in water, the minimum quantity of the calcium-complexing agent is approximately 2 millimoles/g of rennet casein. It is preferred to add from 5 to 15 millimoles/g. Solubilization is obtained at lower pH-values than in the case of phosphocalcic casein, for example of the order of pH 6.1 where the clacium-complexing agent is an equimolecular mixture of citrate and phosphate.

The calcium-complexing agent may of course be added as such, for example in the form of sodium or potassium citrate or phosphate, although it may also be added in two stages and formed in situ. Thus, the suspension may be treated first with citric acid or phosphoric acid, provided that the pH-value thereof does not fall below about pH 4.6 and then with an alkaline agent such as sodium or potassium hydroxide or even the corresponding carbonates and bicarbonates so as to adjust the pH-value of the medium to at least pH 6.8 or ph 7.5, depending on whether citric acid or phosphoric acid has been used. Preferably the pH is increased to from 6.9 to 8.0 or to from 7.5 to 8.0.

The aqueous medium in which the casein is suspended may be pure water or aqueous solution containing various ingredients, such as salts, sugars, colorants, flavorings, soluble proteins, especially lactalbumin (for example an aqueous medium of the whey type), etc. On the other hand it is clear from the foregoing that thi aqueous solution should not contain substantial quantities of the solubilizing agent, in which case the reaction between the casein and the solubilizing agent would take place immediately and the suspension would have no opportunity to age. Accordingly, it is necessary to avoid the presence of alkaline or calcium-complexing agents.

The temperature at which all these operations are carried out is not a factor of any great significance provided that it does not in any way affect the integrity of the casein in question. Thus, this temperature may be as high as approximately 80° C in continuous operation, although it is preferably in the range from 20° to 70° C.

The solution obtained may be used as such in the preparation of an edible composition, if necessary after adjustment of the pH. It may also be concentrated and then dried by any method, leaving a caseinate in the form of a white powder. Unlike the casein in powder form used to begin with, this caseinate may be directly solubilized in water, giving a true solution, a colloidal solution or a gel. The composition of the caseinate may be modified, in particular standardized, before or, if necessary, after drying by the addition of magnesium salts or chlorides for example. These caseinates may also be pasteurized or sterilized.

It is obvious that the solution obtained is only homogeneous with respect to casein and solubilizable materials. If, in addition to casein, insoluble materials are present at the outset, they will of course remain undissolved. For example if insolubilized lactalbumin is present in addition to the casein, it will remain undissolved, in part at least. This case is encountered in the treatment of co-precipitates which, in addition to casein, contain lactalbumin coagulated at a temperature above about 60° C.

The process according to the invention is preferably carried out with a casein which has been washed, optionally pasteurized or sterilized, and size-reduced into particles of constant and appropriate grain size. These operations may be carried out by suspending the crude casein in a very large quantity of water, grinding the casein in the water, removing at least part of the washing water (by decantation, centrifuging or any other method) and resuspending the washed, hydrated and ground casein in a suitable quantity of aqueous medium. These operations are advantageously carried out in line with the operations by which the process according to the invention is actually carried out.

The suspension thus obtained is left to age, preferably with stirring, followed by the gradual and progressive addition of the solubilizing agent, namely the alkaline agent or calcium-complexing agent, either directly (citrates or phosphates) or in two stages (citric acid or phosphoric acid and then alkaline agent). In the latter case, the phosphocalcic casein for example may be directly suspended in the citric or phosphoric acid. It is important to ensure that this addition or these additions is/are made progressively so as to prevent the appearance in the suspension of zones where the pH changes suddenly or of zones containing calcium-complexing agent. To this end, it is preferred to use a dilute solubilizing agent and an apparatus of the type described hereinafter.

The invention also provides an apparatus for continuously solubilizing a suspension of casein in powder form in an aqueous medium which comprises means for circulating this suspension of casein in aqueous medium, meand for holding the suspension for at last 10 minutes before a solubilizing agent is added and means for progressively introducing the said solubilizing agent into the suspension.

An apparatus of this type constitutes a production line which may be completed upstream by means for washing and grinding the crude casein and downstream by means for drying the solution obtained.

The means for holding the suspension before addition of the solubilizing agent may be in the form of a buffer tank of sufficient volume, or in the form of one or more pipes of adequate length calculated for example according to the rate of circulation of the suspension.

The accompanying drawings show one example of an apparatus for carrying out the process according to the invention.

FIG. 1 diagrammatically illustrates a preferred production line for solubilizing casein in a single stage.

Figure 2:
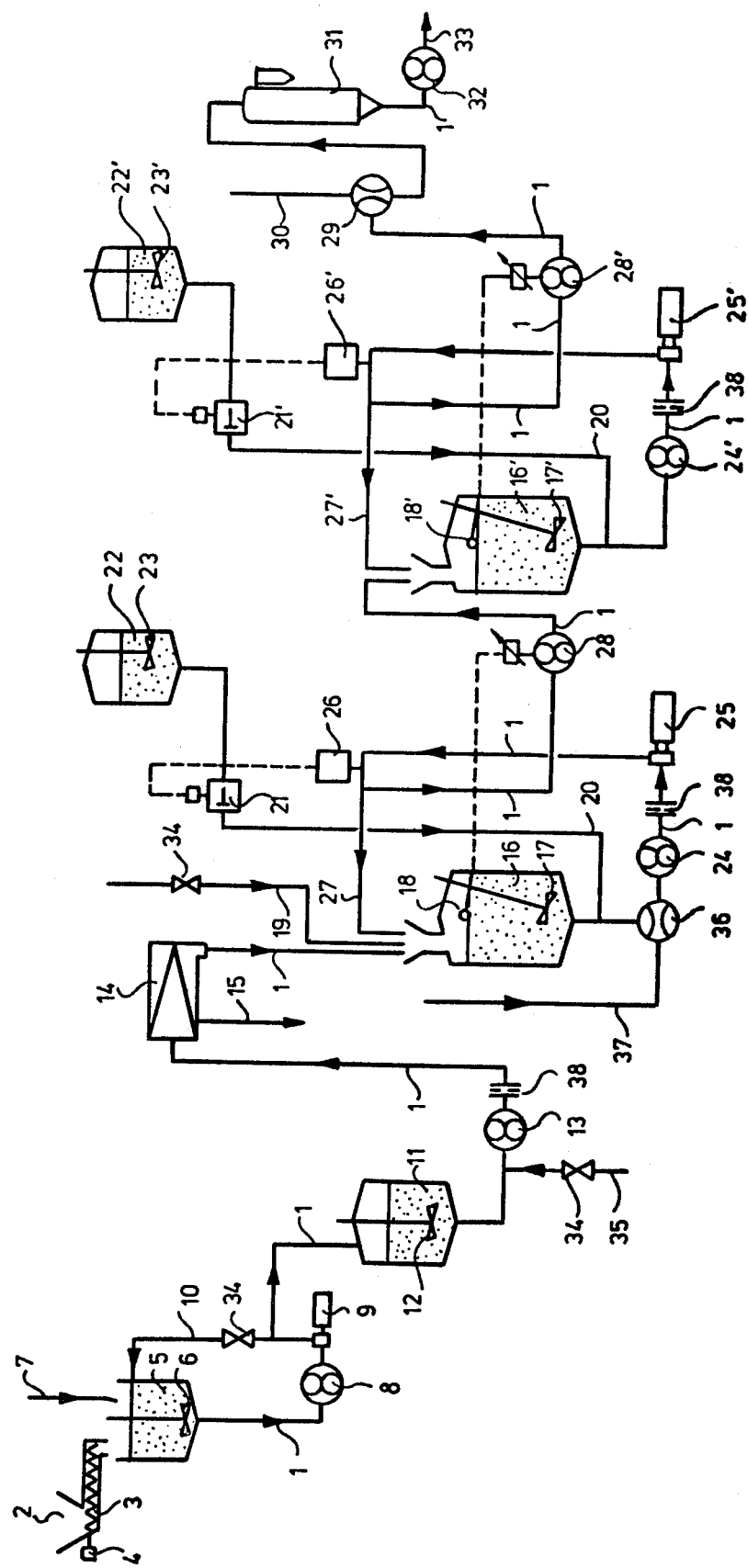

FIG. 2 diagrammatically illustrated a preferred production line for solubilizing casein in two stages.

In these Figures, the broken lines indicate the control circuits, the liquids (suspensions or solutions) being indicated by dotted lines.

As shown in FIG. 1, the production line comprises a number of elements arranged in series and connected by a line 1. These elements, listed in the order in which they are arranged in the downstream direction, are as follows:

a feed hopper 2 equipped with a metering screw 3 actuated by a motor 4 a hydration tank 5 equipped with a stirrer 6 and fed with casein by the hopper 2 and with water by the pipe 7 a positive displacement pump 8 (described in short as a positive pump)

a colloid mill 9 a pipe 10 for recycling part of the casein suspension a holding tank 11 equipped with a stirrer 12 a positive pump 13 a horizontal decanter 14 equipped with a pipe 15 for the removal of water a solubilization tank 16 equipped with a stirrer 17 and a float 18 controlling a positive pump 28 situated downstream in the line, said tank 16 being fed with water by a pipe 19; the outlet of this tank has connected to it a pipe 20 for introducing solubilizing agent which is supplied (by a metering pump 21 operable in response to a pH-meter 26 positioned downstream in the line) from a storage tank 22 equipped with s stirrer 23.

a positive pump 24 a colloid mill 25 the pH-meter 26 controlling the metering pump 21 which regulates the input of solubilizing agent a pipe 27 for recycling into the solubilization tank 16 part of the casein treated by the solubilizing agent the positive pump 28 controlled by the float 18 of the solubilization tank a steam injector 29 with its steam feed pipe 30 a degassing chamber 31 a positive pump 32 if necessary, a drying tower 33 (not shown).

In addition, this line is equipped with a number of valves 34 for regulating the throughputs. Moreover, and as shown in the drawing, it may be equipped with an auxiliary water inlet 35 and with a steam injector 36 with its steam feed pipe 37 situated between the pipe for introducing the solubilizing agent 20 and the positive pump 24. This auxiliary water inlet and this injector are intended for controlling and regulating temperature, and may be replaced by heaters, for example tubular heaters. Finally, the line may also be equipped with diaphragms 38. A line such as this may be used for the solubilization of suspensions of acid casein by neutralization, or for the solubilization of suspensions of phosphocalcic or rennet casein by means of citrates or phosphates.

As shown in FIG. 2, the production line comprises the same components as the line illustrated in FIG. 1, the solubilization tank 16 performing the function of a pretreatment tank (pretreatment with citric acid or phosphoric acid). Solubilization proper takes place in tank 16' equipped in the same way as the tank 16 with accessories 17' to 28'. This line may be used for solubilization in two stages (citric acid or phosphoric acid, followed by neutralization).

The process according to the invention is illustrated by the following Examples.

EXAMPLE 1

Sodium caseinate from acid casein

The production line illustrated in FIG. 1 is used.

By means of the hopper 2, the tank 5 is fed with an acid casein in powder form with a moisture content of 10% and a very coarse texture. The input of casein amounts to 565 kg/h. Through the pipe 7, the tank 5 receives water at 45° C at a rate of 2000 kg/h. The suspension obtained is pumped by the pump 8 and enters the colloid mill 9 where the particles of casein are ground. Approximately 9/10ths of the suspension are returned to the tank 5 through the pipe 10, the remaining 1/10th being continuously removed and introduced into the holding tank 11 of which the dimensions are such that the suspension remains there for about 30 minutes with vigorous stirring. The hydrated casein suspension is continuously removed by the pump 13 and is cooled by the addition of cold water (10° to 12° C) through the pipe 35. This addition is made upstream of the pump 13 at a rate of approximately 9000 kg of water/h. The suspension then passes through a diaphragm 38 and enters a centrifugal decanter 14 where it is freed from the washing water which is removed by way of the pipe 15 (at a rate of 10565 kg/h). Reconstituted curds with a dry extract of approximately 50% are thus obtained at a rate of 1000 kg/h. These curds are introduced into a tank 16, the so-called solubilization tank, where they are stirred very vigorously. Water is also introduced into this tank through the pipe 19 at a rate of 1280 kg/h. In addition, part of the caseinate formed and recycled is introduced through the pipe 27. The pipe 20, carrying a 3% sodium hydroxide solution at a rate of 425 kg/h, opens at the outlet end of the tank. In addition, an injector 36 enables steam to be introduced for heating the whole to 70° C and reducing viscosity. The whole recirculates, passing through a diaphragm 38 and a colloid mill 25, and is monitored by the pH-meter 26.

When a pH of 6.8 is reached, the operation becomes continuous, introduction of the sodium hydroxide being controlled in response to the pH-meter 26. Part of the caseinate formed is removed by the pump 28, the rest being delivered into the tank 16 through the pipe 27. This pump 28 is controlled by the float 18 so as to keep the level constant in the tank 16. The part removed enters a steam injector 29 for pasteurization at 130° C, subsequently flows into a degassing chamber 31 and is delivered by the pump 32 to a drying tower 33.

Sodium caseinate in the form of a white powder with a residual moisture content of the order of 4% is thus obtained at a rate of 500 kg/h. This caseinate is soluble in water.

EXAMPLE 2

Potassium caseinate from acid casein

The procedure of Example 1 is repeated with an acid casein having a moisture content of 10% and ground to a grain size of approximately 90 mesh (US Standard Screen). The input of casein amounts to 90 kg/h and the input of water at 45° C to 260 kg/h. The suspension recirculates at a rate of 700 kg/h, 350 kg/h being delivered into the tank 5 by the pipe 10 and 350 kg/h being removed and introduced into the tank 11 for approximately 30 minutes' residence. At the outlet end of this tank, water at 10° to 12° C is introduced through the pipe 35 at a rate of 1000 kg/h. After passage through a diaphragm 38 and separation in the centrifugal decanter 14, reconstituted curds with a dry extract of 45% are obtained at a rate of 178 kg/h. Neutralisation is carried out continuously in the same way as described in Example 1 with recirculation through a diaphragm 38 and a colloid mill 25, the pipe 19 introducing water at 50° C at a rate of 220 kg/h and the pipe 20 a 3% potassium hydroxide solution. The whole is heated to 70° C by the introduction of steam by means of the injector 36. Drawing off begins at pH 6.8. After pasteurization, degassing and drying in the same way as described above, potassium caseinate is obtained at a rate of 80 kg/h.

EXAMPLE 3

Calcium caseinate from acid casein

The procedure is as in Example 1, the operating parameters being as follows:
  acid casein with 5% moisture: 102 kg/h
  water at 45° C (pipe 7): 500 kg/h
  residence: approximately 30 minutes
  water at 30° C (pipe 35): 1550 kg/h.

Reconstituted curds with a dry extract of 48% are thus obtained at a rate of 200 kg/h after passage through a diaphragm 38 and separation in the decanter 14.
  continuous neutralization with a 5% calcium hydroxide solution (pipe 20): 58 kg/h
  hot water at 60° – 70° C (pipe 19): 225 kg/h
  recirculation through a diaphragm 38 and a colloid mill 25
  no injector 36, instead a tubular heater
  continuous drawing off at pH 6.8.

After pasteurization at 130° C, degassing and drying, calcium caseinate powder with a residual moisture content of 4% is obtained at a rate of 95 kg/h.

EXAMPLE 4

Mixed caseinate from phosphocalcic casein

The procedure of Example 1 is repeated as follows, starting with phosphocalcic casein:
  phosphocalcic casein with 4% moisture: 100 kg/h
  water at 40° C (pipe 7): 3100 kg/h residence: approximately 30 minutes.

Reconstituted curds with a dry extract of 45% are thus obtained at a rate of 211 kg/h after passage through a diaphragm 38 and separation in the decanter 14.

continuous addition of a 10% solution of $K_3PO_4$(pipe 20) : 140 kg/h water at 50° C (pipe 19) : 223 kg/h recirculation through a diaphragm 38 and a colloid mill 25 continuous drawing off at pH 7.8.

After high-temperature pasteurization, degassing and drying, a mixed calcim/potassium caseinate with a residual moisture content of 4%, which constitutes a "phosphocalcic casein" powder soluble in water, is obtained at a rate of 110 kg/h.

EXAMPLE 5

Mixed caseinate from phosphocalcic casein

The production line illustrated in FIG. 2 is used. The tank 16 is used as the tank for treatment with citric acid, whilst the tank 16' is used for neutralization. The operating parameters are as follows:

phosphocalcic casein, coarse-grained, 10% moisture content: 305 kg/h water at 40° C (pipe 7) : 6500 kg/h residence: 30 minutes.

After passage through a diaphragm 38 and separation in the decanter 14, reconstituted curds with a dry extract of 45% are obtained at a rate of 610 kg/h and introduced into the tank 16:

continuous addition of a 10% citric acid solution : 154 kg/h hot water at 70° C (pipe 19) : 850 kg/h recirculation through a diaphragm 38 and a colloid mill 25 continuous drawing off at approximately pH 4.6 average contact time with the citric acid, approximately 1 h

The part drawn off is introduced into the tank 16';

continuous neutralization with 3% potassium hydroxide solution : 170 kg/h recirculation through a diaphragm 38 and a colloid mill 25' drawing off at pH 6.9.

After pasteurization, degassing and drying a mixture calcium/potassium caseinate with a residual moisture content of 4%, which constitutes a "phosphocalcic casein" powder soluble in water, is obtained at a rate of 275 kg/h. EXAMPLE 6

Mixed caseinate from rennet casein

A 2% suspension of rennet casein in water is prepared and left to hydrate for 30 minutes with vigorous stirring (pH 7.1). This is followed by the gradual addition of an equimolar mixture of trisodium citrate and monosodium phosphate up to a concentration of these salts of 1.34%. The rennet casein then passes into solution in the form of a colloidal solution with a pH of 6.44. A white water-soluble powder is obtained by drying.

This operation is repeated with 5 and 10% suspensions of rennet casein in water. Addition of the same quantities of citrate and phosphate does not bring about dissolution. A considerable "undissolved fraction" remains.

On the other hand, the addition of citrate and phosphate at a temperature of 20° C up to a concentration of 3.35% causes the dissolution of 2%, 5% and 10% suspensions of rennet casein in water. In the case of 2% and 5% of rennet casein, colloidal solutions are obtained (pH = 6.10 and 6.24) whereas in the case of 10% of rennet casein, a viscous gel is obtained (pH = 6.26).

EXAMPLE 7

Mixed caseinate from acid-washed rennet casein

A rennet casein containing 2.80% of calcium is washed liberally with an acetic acid solution of pH 4.6. This operation is repeated a second time. After rinsing, the casein obtained is suspended in pure water. By neutralization to pH 6.5 with 0.6 N sodium hydroxide, this casein is dissolved, its concentration being of the order of 10%. The casein may be precipitated by the addition of calcium, and redissolved by the addition of citrate or phosphate.

We claim:

1. An apparatus for solubilizing a suspension of powder casein in an aqueous medium which comprises
   a source of casein,
   a hydration tank in which water and powder form casein can be received, said hydration tank including stirring means for stirring said casein and water to form a suspension therewith,
   a holding tank,
   means for conveying suspension from said hydration tank to said holding tank,
   a solubilizing tank,
   means for conveying suspension from said holding tank to said solubilizing tank at such rate that the suspension has a residence time in said holding tank of at least 10 minutes,
   a source of solubilizing agent,
   means for introducing the solubilizing agent into said solubilizing tank, said solubilizing tank including a stirring device for stirring the suspension therein whereby a caseinate is formed in said solubilizing tank,
   control means including a pH sensing unit operable responsive to the pH level of the caseinate in said solubilizing tank for controlling the solubilizing agent introduction means to control the rate at which said agent is introduced into said solubilizing tank,
   means for withdrawing caseinate from said solubilizing tank and recycling a first portion thereof to said solubilizing tank, there further being means for conveying the remainder portion of the caseinate withdrawn from said solubilizing tank to a drying operation, and
   a float control unit in said solubilizing tank connected to and operably controlling said withdrawal means responsive to variations in the level of caseinate in said solubilizing tank from a predetermined value.

2. The apparatus of claim 1 further comprising means intervening said holding tank and said solubilizing tank for adding water to said suspension to facilitate washing of the casein therein, there further being provided a separator unit downstream of the location of said water addition means but upstream of said solubilizing tank for removing the washing water.

3. The apparatus of claim 1 further comprising a colloid mill, the caseinate withdrawn from said solubilizing tank being passed through said colloid mill to grind the casein therein prior to the recycle of said first portion to said solubilizing tank and conveyance of said remainder portion to the drying operation.

4. The apparatus of claim 1 further comprising a pretreatment tank intervening said holding tank and said solubilizing tank, the suspension in ssid holding tank being conveyed to said pretreatment tank, there further being associated with said pretreatment tank, a source of a pretreatment agent, means for introducing the pretreatment agent into said pretreatment tank, said pretreatment tank including a stirring device for stirring the suspension therein, control means including a pH sensing unit operable responsive to the pH level of the suspension in said pretreatment tank for controlling the pretreatment agent introduction means to control the rate at which said agent is introduced into said pretreatment tank, means for withdrawing suspension from said pretreatment tank and recycling a first portion thereof to said pretreatment tank, there further being means for conveying the remainder portion of the suspension withdrawn from said pretreatment tank to said solubilizing tank, and a float control unit in said pretreatment tank connected to and operably controlling said withdrawal means responsive to variation in the level of suspension in said pretreatment tank from a predetermined value.

* * * * *